US 6,917,928 B1

(12) United States Patent
Pellinat

(10) Patent No.: US 6,917,928 B1
(45) Date of Patent: Jul. 12, 2005

(54) SYSTEM AND METHOD FOR PERSONAL DEVELOPMENT TRAINING

(75) Inventor: Martin Pellinat, Los Angeles, CA (US)

(73) Assignee: Idego Methodologies, Inc., San Diego, CA (US)

( * ) Notice: Subject to any disclaimer, the term of this patent is extended or adjusted under 35 U.S.C. 154(b) by 638 days.

(21) Appl. No.: 09/834,779

(22) Filed: Apr. 12, 2001

(51) Int. Cl.[7] .......................... G06F 15/18; G06F 17/00
(52) U.S. Cl. ........................................... 706/59; 706/60
(58) Field of Search ...................................... 706/59, 60

(56) References Cited

U.S. PATENT DOCUMENTS

| | | | | | |
|---|---|---|---|---|---|
| 5,172,313 | A | * | 12/1992 | Schumacher | 705/7 |
| 5,392,382 | A | * | 2/1995 | Schoppers | 706/62 |
| 5,835,758 | A | * | 11/1998 | Nochur et al. | 707/102 |
| 5,873,071 | A | * | 2/1999 | Ferstenberg et al. | 705/37 |
| 5,903,453 | A | * | 5/1999 | Stoddard II | 700/79 |
| 5,954,510 | A | * | 9/1999 | Merrill et al. | 434/236 |
| 6,322,366 | B1 | * | 11/2001 | Bergan et al. | 434/118 |
| 6,338,628 | B1 | * | 1/2002 | Smith | 434/236 |
| 6,421,655 | B1 | * | 7/2002 | Horvitz et al. | 706/61 |
| 6,438,893 | B1 | * | 8/2002 | DeCorby | 43/62 |
| 6,442,527 | B1 | * | 8/2002 | Worthington | 705/8 |
| 6,618,723 | B1 | * | 9/2003 | Smith | 707/5 |
| 6,643,385 | B1 | * | 11/2003 | Bravomalo | 382/100 |
| 2002/0145626 | A1 | * | 10/2002 | Richards et al. | 345/741 |

OTHER PUBLICATIONS

Palma–dos–Reis et al., "Designing personalized intelligent financial decision support systems," Decision Support Systems 26, (1999), pp. 31–47.*

Marakas, "The Discovery–Learning DSS: Allowing for Discovery in the Decision Process," Prtoceeding of the 25th Annual Hawaii International Conference on System Sciences (1995), pp. 72–81.*

Palma–dos–Reis et al., "Designing personalized intelligent financial decision support systems", Decision Support Systems 26, pp. 31–47 (1999).

Marakas, "The Discovery–Learning DSS: Allowing for Discovery in the Decision Process", Proceedings of the 28th Annual Hawaii International Conference on System Sciences, pp. 72–81 (1995).

* cited by examiner

Primary Examiner—Anthony Knight
Assistant Examiner—Michael B. Holmes
(74) Attorney, Agent, or Firm—Hogan & Hartson, LLP

(57) ABSTRACT

A computer-implemented system and method for personal development training. User input is obtained comprising the user's vision and goal, possible outcomes, influencing factors on the possible outcomes and relevant data for each of the influence factors. For each influence factor, the risk associated with the influence factor is reduced to an acceptable level if the risk is too high relative to the importance of the influence factor. The user input is processed and an action plan based on the user input is generated and displayed.

25 Claims, 10 Drawing Sheets

①

*the*
*ZOOM FACTOR*

VISION: ☐
GOAL: ☐

[E̲xit]  [B̲ack]  [N̲ext]  [A̲dd]

Possible Outcome:

A: [▼]

[E̲xit]  [B̲ack]  [N̲ext]  [A̲dd Outcome]

B: Influencing Factors:
▼

C: How it Affects The Outcome:
▼

D: Weight On Outcome: 1▲▼

[Exit] [Back] [Next] [Add Factors]

E: What Drives The Influencers:
▼

F: Place A Time Frame On This Motivator:
▼

[Exit] [Back] [Next] [Add Influence]

*Figure 9*

[5] How To Positively Affect This Driver:

G [dropdown]

H Weight Of Affecting Driver: [1]

I Risk (or difficulty) To Do This: [1]

J Willingness To Take The Risk: [1]

[Exit] [Back] [Next] [Add Weights]

*Figure 10*

[6] If D>5 and I>5 and H>5 and J>5. We go here. Else Go to Formulate Action Plan Place List from "G" Here
[        ]

How To Reduce Taking Risk
(User Input)

Weight of this action

[1] L.

[        ] K.

[Exit] [Back] [Next] [Add Influence]

SYSTEM AND METHOD FOR PERSONAL DEVELOPMENT TRAINING

FIELD OF THE INVENTION

The present invention relates generally to personal development training and, more particularly, relates to a computer-implemented system and method for training and development of an action plan.

BACKGROUND OF THE INVENTION

Small and medium sized businesses and corporations spend over one billion dollars per year in outsourced seminar programs. The seminar programs typically take the form of training in areas such as technology updates, management/leadership, sales strategies and initial, web-based on-the-job training. The teaching modalities used in these seminar programs have historically been presented using a T-bar situation analysis methodology and implemented as paper-based flipcharts and/or 3-ring binders of antiquated information. This paper-based approach has demonstrated little effectiveness in changing the behavior and follow up of participants, and is fast becoming outmoded in society's exciting new information age.

Today's generation is being taught by the latest modalities of information access, including Internet, web-based programs and CD-ROM/DVD interactive models. These upgraded modalities, however, have not been applied in the field of sales training. Moreover, although there is approximately a 250 million dollar nationwide market for outsourced seminars, no existing company has integrated their approach with the personal management systems of the future, such as Palm, Inc.'s Palm™ handheld devices, Internet Commerce Corp.'s ACT!™ contact manager, and Microsoft's Outlook®.

SUMMARY OF THE INVENTION

The present invention is directed towards an improved system and method for processing and prioritizing the goal setting and decision-making process, and for developing a high-end strategy or action plan for implementation by a user. The method uses a unique step-by-step approach and a methodology based on weights and risk factors. It is computer-implemented and is intended to replace outmoded and wasteful seminar programs and antiquated paper-based teaching modalities. The methodology and system disclosed herein may be implemented as stand-alone computer software or, alternatively, as a Web-based and accessible program. Preferably, a "wizard" approach is used, that is, the method is presented to the user as a screen-by-screen guide ultimately resulting in completion and generation of an action plan unique to the user's particular problem or issue. This approach evokes creativity and brings the user to emotional levels that facilitate creative solutions.

Accordingly, in one embodiment of the invention, a computer-implemented system for personal development training is provided. The system includes user input comprising the user's goal, possible outcomes and influence factors on the possible outcomes, and a processor for processing the user input and generating an action plan based on the user input.

In another embodiment of the invention, a computer-implemented method for personal development training is provided. First, user input is obtained comprising the user's vision and goal, possible outcomes, influencing factors on the possible outcomes and relevant data for each of the influence factors. Next, for each influence factor, the risk associated with the influence factor is reduced to an acceptable level if the risk is too high relative to the importance of the influence factor. Finally, an action plan is generated and displayed to the user based on the user input.

In another embodiment of the invention, a computer program product comprising a computer useable medium having computer program instructions stored therein for generating an action plan based on user input is provided. The computer program product comprises instructions for obtaining user input comprising the user's vision and goal, possible outcomes, influencing factors on the possible outcomes and relevant data for each of the influence factors; for each influence factor, reducing a risk associated with the influence factor to an acceptable level if the risk is too high relative to the importance of the influence factor; and generating and displaying an action plan to the user based on the user input.

BRIEF DESCRIPTION OF THE DRAWINGS

The present invention is described with reference to the accompanying drawings. In the drawings, like reference numbers indicate identical or functionally similar elements.

FIG. 6 is a software application window illustrating one embodiment of an interactive form that permits entry of vision and goal statements.

FIG. 7 is a software application window illustrating one embodiment of an interactive form that permits entry of possible outcomes.

FIG. 8 is a software application window illustrating one embodiment of an interactive form that permits entry of influencing factors and associated data.

FIG. 9 is a software application window illustrating one embodiment of an interactive form that permits entry of more data associated with the influencing factors.

FIG. 10 is a software application window illustrating one embodiment of an interactive form that permits entry of further data associated with the influencing factors.

FIG. 11 is a software application window illustrating one embodiment of an interactive form that permits entry of data associated with reducing the risk associated with the influencing factors.

DETAILED DESCRIPTION OF PREFERRED EMBODIMENTS

Vision and Goal Statements

Figure 1:
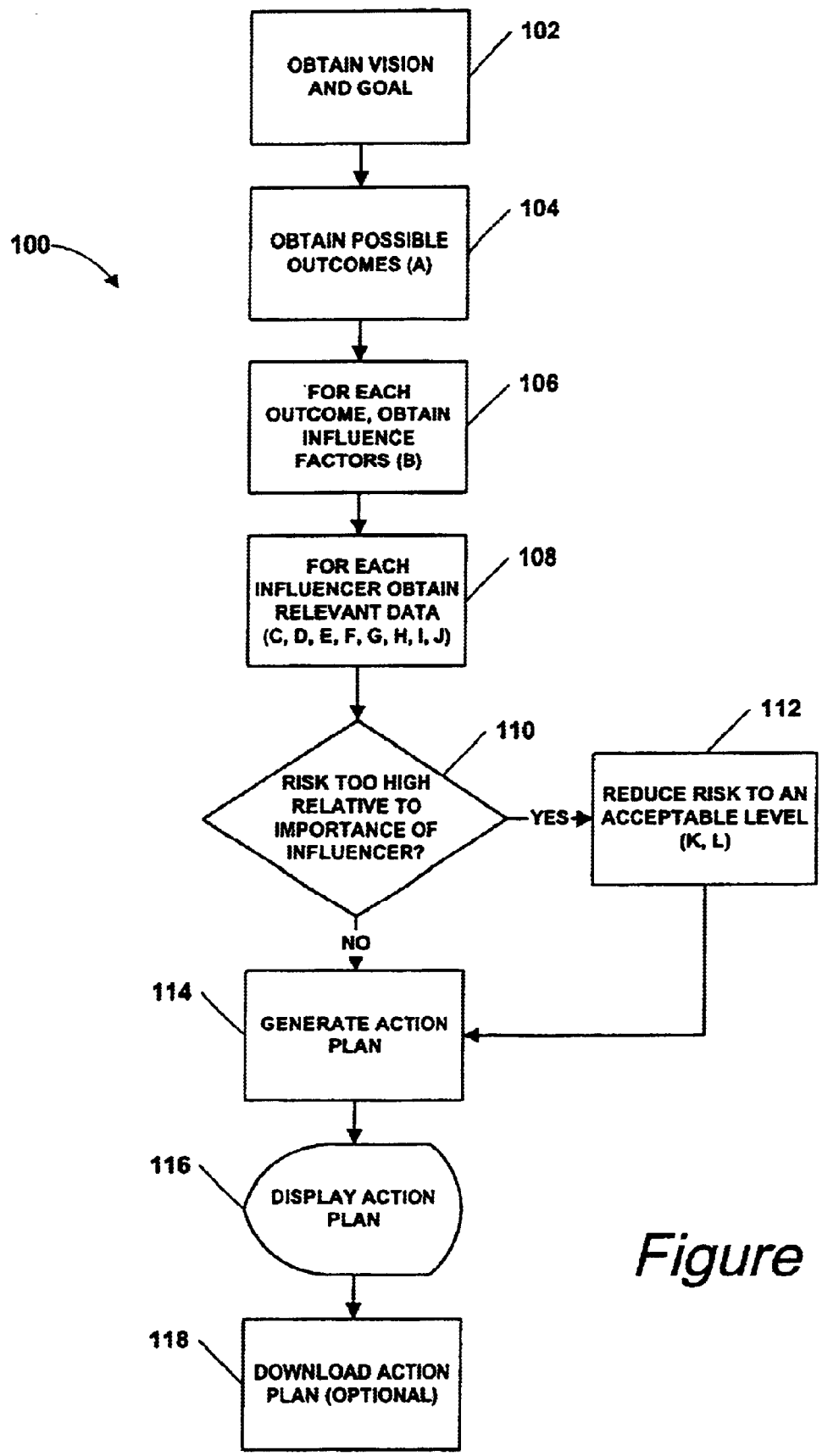
FIG. 1 is a high-level overview flow diagram of a method for generating an action plan according to the present invention.

A high-level overview flow diagram 100 of the present invention is presented in FIG. 1. As indicated at step 102, the first task is to obtain vision and goal statements from the user. One embodiment of a software application screen or window that permits a user to enter vision and goal statements is depicted in FIG. 6. The "vision" is the user's ultimate vision of accomplishment. Examples of the type of vision statements that may be entered include "vacation", "buy a house", and "save $50,000 to invest and put the children through school". The "goal" is a more specific goal that will permit accomplishment of the user's vision. An example of a goal that might be entered is "reach sales forecast as a computer salesman". As indicated in FIG. 6 by the presence of the "Add" command button, the user may enter more than one vision and/or goal statement.

Possible Outcomes

In step 104, after entering the vision and goal statements, the user is prompted to provide one or more possible outcomes (A). FIG. 7 depicts an example software application screenshot that permits a user to enter possible outcomes. The presence of the "Add Outcome" command button in FIG. 7 indicates that multiple outcomes may be entered from this screen. An example of a desirable outcome that might be entered is "sell top-end system and meet/exceed quota". An example of an undesirable outcome might be "fail to reach sales goal and lose job." The user may enter multiple possible outcomes and the system will walk the user through each outcome and consequent results. However, the system will typically only process the best (most desirable) outcome. Thus, in the paragraphs to follow in this detailed description, the examples given assume the most desirable outcome has been chosen for processing by the system, namely, "sell top-end system and meet/exceed quota."

Decision Making Criteria

The decision-making process requires the user to develop certain criteria upon which to rank, develop, and base decisions. It is explicitly contemplated by the present invention that such criteria includes the following non-exhaustive list of common decision-making criteria: ease of use, obsolescence, compatibility, upgradability, acquisition cost, performance, safety and Maslow's hierarchy of 5 needs. This list is not meant to limit the scope of the decision-making criteria that may be incorporated into the system.

Influence Factors

For each possible outcome the user is prompted to enter one or more influence factors, or "influencers" (B). An influence factor is an obstacle that could stand in the way of the user's reaching his or her goal. These will usually be key decision-makers, or other people involved in the decision-making process. Examples of influencers include the department manager, the CEO, or the purchasing manager. Obtaining the influencers is accomplished in step 106 of FIG. 1.

Relevant Data

Figure 2:
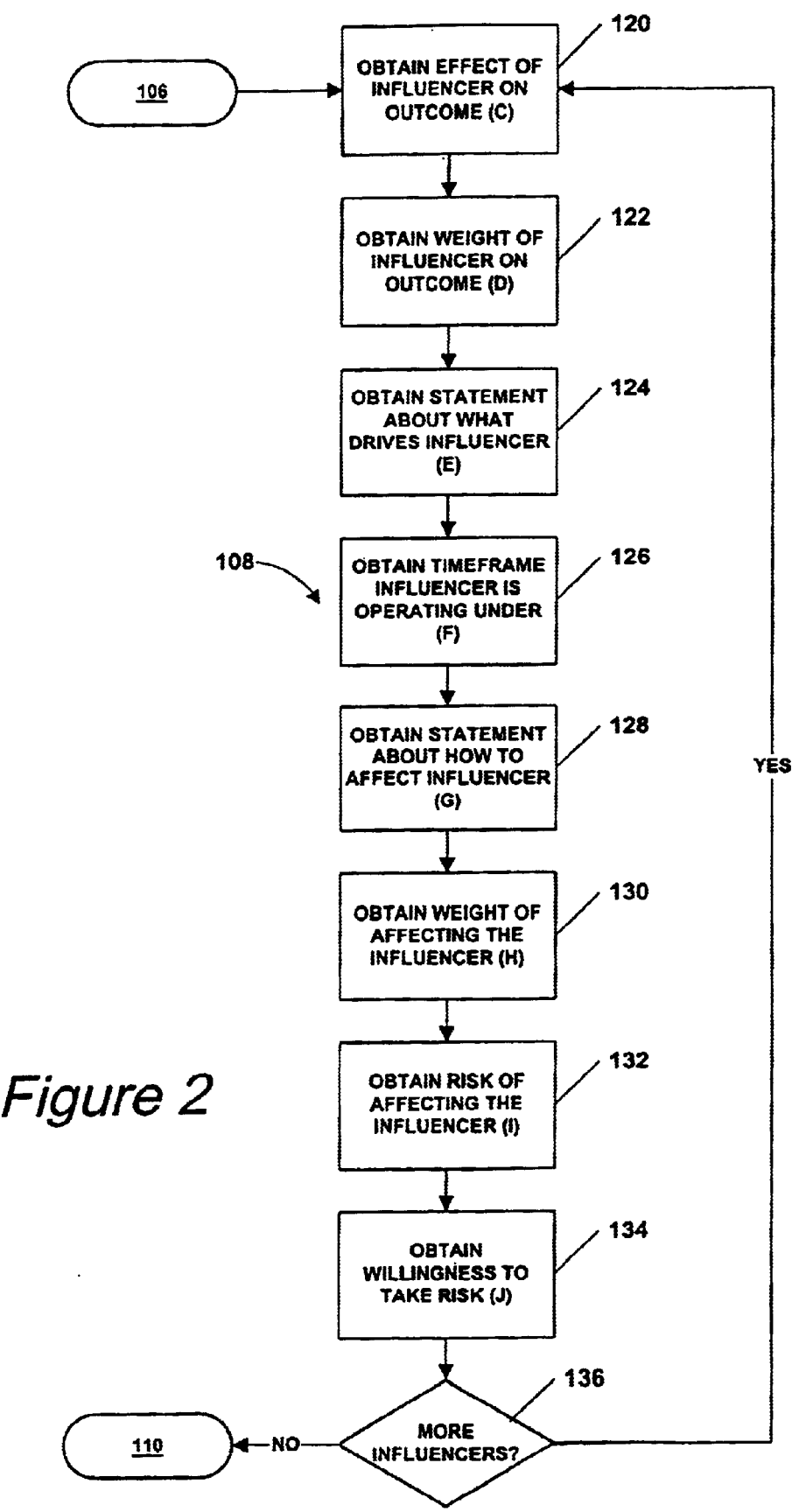
FIG. 2 is a detailed flow diagram of one aspect of the overview flow diagram of FIG. 1 wherein various data relevant to influencing factors is obtained.

In step 108 of FIG. 1, the invention asks the user to input relevant data for each influencer Step 108 of FIG. 1 is expanded and explained in FIG. 2. In step 120, the effect the influencer has on that particular outcome is obtained (C). For example, in the case of the department manager as the influencer, the user might enter "make technical recommendations." In the case of the CEO, the user might enter "authorizes the necessary expenditure"; in the case of the purchasing manager, perhaps "cuts the purchase order." In step 122, the weight each influencer has on the particular outcome is obtained (D). In one embodiment, this weight is input as a ranking on a scale of one to ten. Thus, the user might assign a weight of 8 to the department manager influencer, while assigning only a 6 to the CEO.

In step 124, a statement about what drives the influencer is obtained (E). As examples: department manager might be driven by "needs new system to make department more efficient"; CEO, "overall impact on company"; and purchasing manager, "fiscal year budget constraints". In step 126, the timeframe under which the influencer is operating is obtained (F). The timeframe is the date by when the goal will be attained. Using our previous three example influencers, timeframe considerations may lead the user to input a date of "within one week" of the present date in order to satisfy the department manager; "the time of the next board meeting" to satisfy the CEO; and "the last day of the company's fiscal year" to satisfy the purchasing manager.

In step 128, a statement about how to positively affect the influencer is obtained (G). This statement often takes the form of a creative solution as to how the user can drive the influencer or bring the influencer closer to achieving the goal. The department manager, for instance, may desire that the new system (mentioned above in connection with (E) for making the department more efficient) be comprehensive in its functionality. The CEO, concerned with overall impact, might boost the organization's image in the community by sponsoring a charity bike ride. Knowing that the purchasing manager is very concerned about budget constraints might prompt the user to input "provide best price, warranty, or free shipping".

In step 130, the weight of affecting the influencer is obtained (H). In one embodiment, this weight is input as a ranking on a scale of one to ten. In step 132, the risk (difficulty) of affecting the influencer is obtained (I). In one embodiment, this risk is input as a ranking on a scale of one to ten. The user may deem a fully-loaded, highly functional system very risky and assign a risk factor of, say, 8 at this step. Furthermore, the implementation of a highly functional system designed to improve departmental efficiency comes with associated risks such as the organizational inertia often exhibited by employees who feel forced to accept a new system. Nevertheless, willingness to accept such a risk can either by high or low, depending on the situation. It is in step 134 where the willingness to take the risk of step 132 is obtained by the user (J). In one embodiment, this willingness is input as a ranking on a scale of one to ten. So, a user may assign a willingness ranking of only 2 (on a scale of one to ten) to indicate to the system an attitude of general unwillingness to accept the risk factor of 8. Finally, at step 136, the invention employs a loop for cycling through steps 120–134 for each influencer that was entered in step 106. Once all of the relevant data for each influencer is obtained, processing continues with step 110 of FIG. 1.

FIGS. 8–10 are a series of screen shots, according to one embodiment of the system, that walk the user through steps 104, and 120–136. Each of FIGS. 8–10 includes an "add" command button that gives the user the ability to add multiple factors, influences, or weights, respectively, to the system.

Risk Reduction

Further processing of the data takes place in step 110. Here, the system conditionally branches to step 114 where an action plan is generated only if the risk-to-importance ratio is not too high. Specifically, the ranking data gathered in steps 122, 130, 132, and 134 are fed into a formula used as the branch condition: in one embodiment, if D, H, and I are greater than five, ranked on a scale from one to ten, AND J is greater than five, ranked on a scale of one to ten, then the risk is too high. The risk must be reduced before processing can continue and an action plan can be generated. This risk-reduction technique involves an iterative process of querying the user in one or more "subsets." Each subset is processed as long as the aforementioned condition of D>5 and 1>5 and H>5 and J>5 is met for each. If the condition is not met for a particular subset of the data gathered from previous steps, then risk-reduction for that subset is bypassed. The risk-reduction process is further elucidated in the following paragraph.

Figure 3:
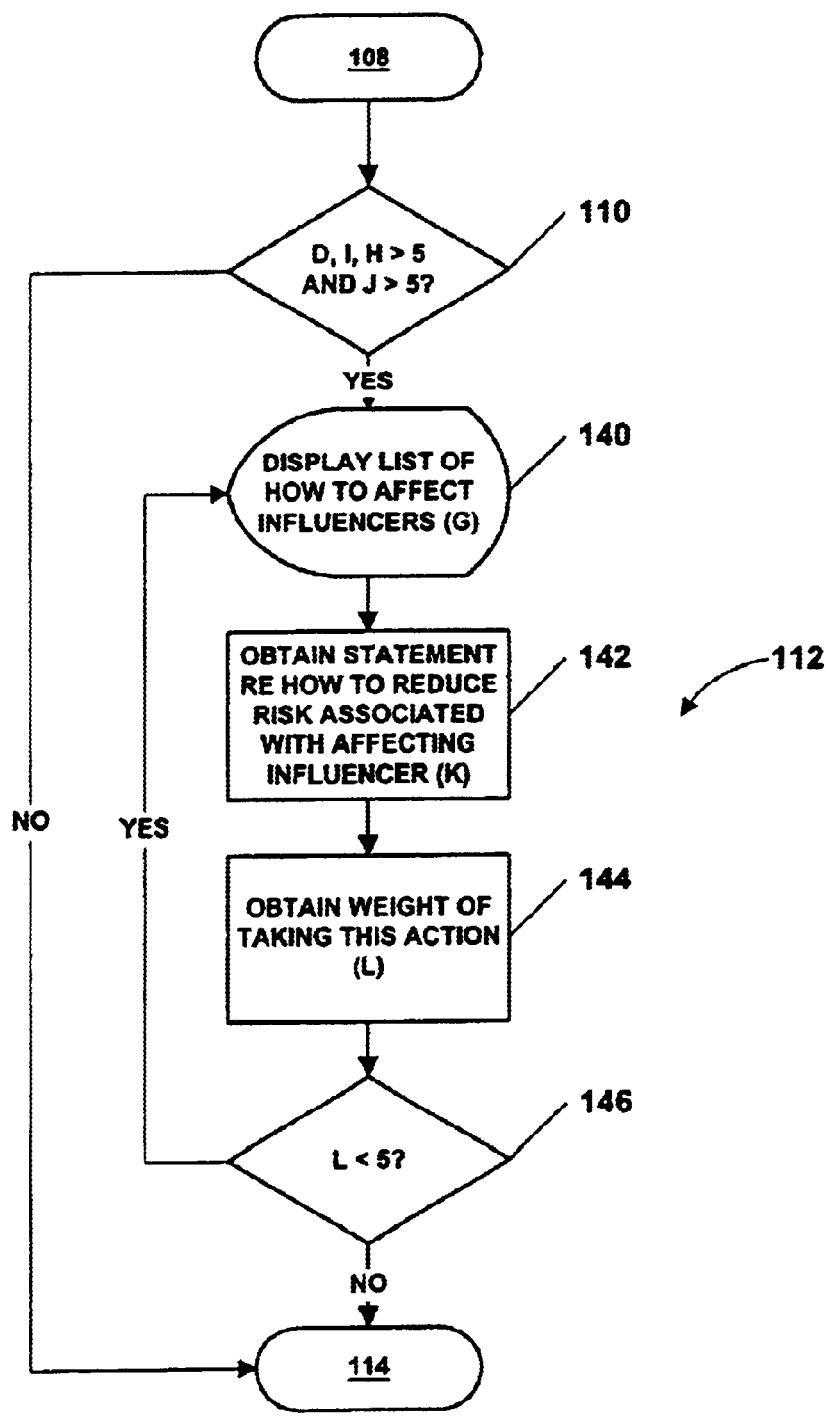
FIG. 3 is a detailed flow diagram of another aspect of the overview flow diagram of FIG. 1 wherein the risk associated with certain influences is reduced.

The step of reducing the risk to an acceptable level, step 112 of FIG. 1, is explained further in steps 140–146 of FIG. 3. In step 140, the system displays the list of ways to positively affect the influencers that was gathered in step 128 for each of the influencers (G). Step 142 prompts for user input on how to reduce the risk associated with affecting the particular influencer (K). Weights (L) are applied to the importance of taking the action that was given in step 142. In one embodiment, this weight is input as a ranking on a scale of one to ten. Finally, a second conditional branch is entered in step 146. If the value of L is less than five, processing will loop back through steps 140–146 until a value of L greater than or equal to five is achieved. Once achieved, processing continues at step 114 where the generation of an action plan begins.

Producing the Action Plan

Figure 4:
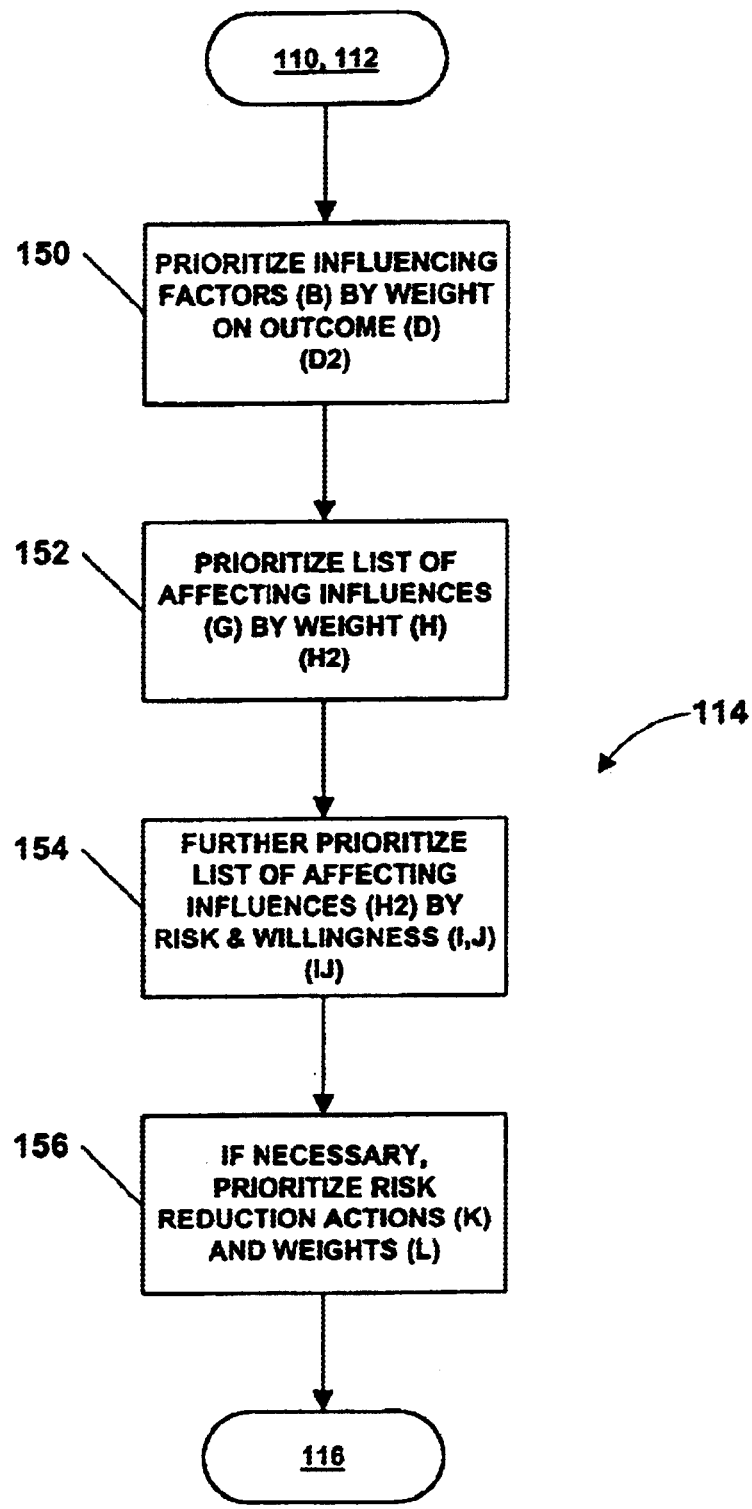
FIG. 4 is a detailed flow diagram of a further aspect of the overview flow diagram of FIG. 1 wherein an action plan is generated.

The step of generating an action plan, step 114 of FIG. 1, is explained in detail in FIG. 4. In step 150 of FIG. 4, the influencing factors (B) are prioritized by weight of the influencer on the outcome as was specified by the user in step 122 of FIG. 2. In step 152 the list of affecting influences (G) are prioritized according to the weights which were supplied by the user in step 130 of FIG. 2. In step 154, the list of affecting influences is further prioritized according to the risk weight (I) and willingness weight (J) that were supplied by the user in steps 132 and 134 respectively. Lastly, in step 156, if necessary, the risk reduction actions and risk reduction weights are prioritized based on the statement(s) and weight(s) that may have been gathered from the user in steps 142 and 144 in FIG. 3. Steps 150–154 use a formulaic approach that we summarize as follows:

Formula for Producing an Action Plan

The functions used to produce the user's action plan are outlined below:

1. Step 150—Prioritize influencing factors (B) by (D)=D2
2. Step 152—Prioritize list of Affecting Drivers (G) by (H)=H2
3. Step 154—Further prioritize (drill down) list of Affecting Drivers (H2) by I+J=IJ Each of the results derived by the formulas mentioned here incorporate the weights entered by the user. Step 150 applies the user-supplied weight (D) from step 122 to the particular influencer (B). Step 152 applies the user-supplied weight (H) from step 128 to the particular statement about how to affect the influencer (G). And step 154 applies the user-supplied risk weight (I) and willingness weight (J) from steps 132 and 134 to the prioritized list of affecting drivers from step 152. In this manner, the list of influencing factors is prioritized for use in the development of the action plan.

Displaying an Action Plan

Figure 5:
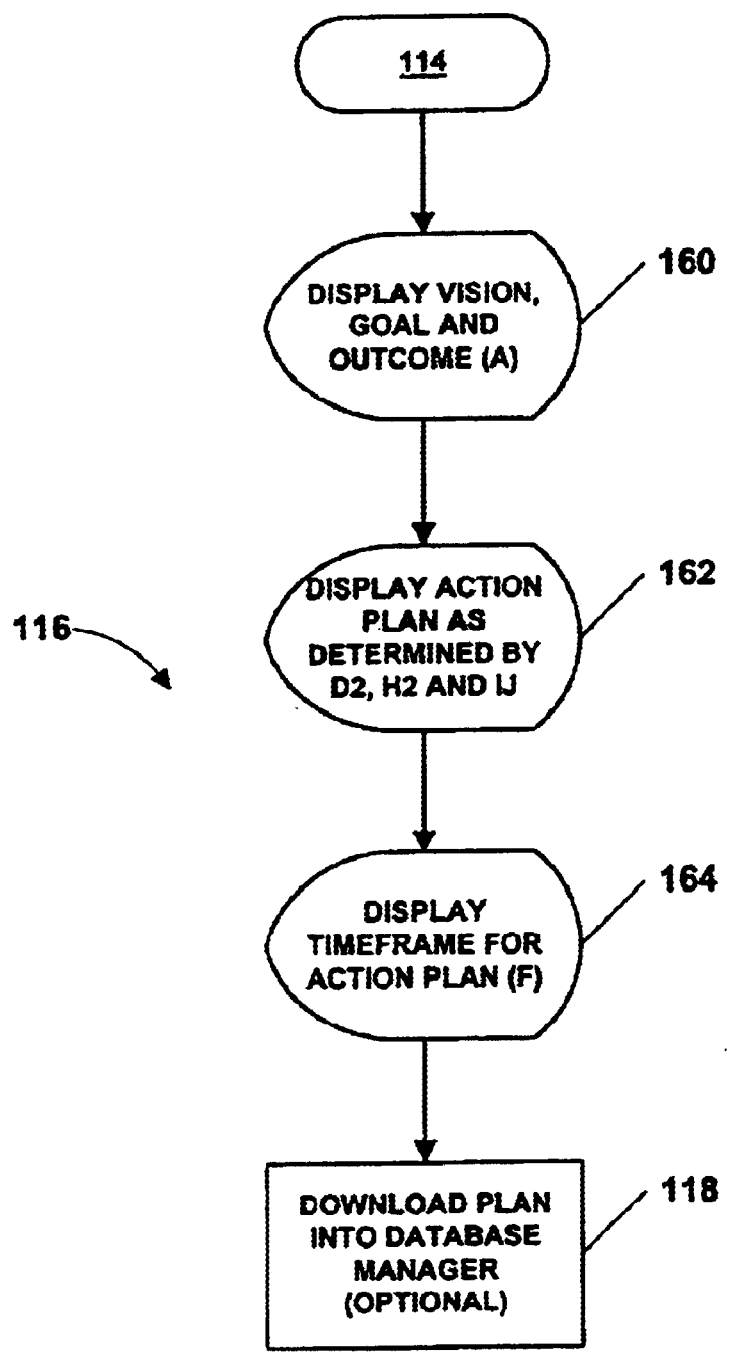
FIG. 5 is a detailed flow diagram of a still further aspect of the overview flow diagram of FIG. 1 wherein the generated action plan is displayed.

FIG. 5 describes the step of displaying the action plan. Beginning with step 160, the system displays the vision from step 102, the goal from step 102, and the outcome or outcomes from step 104. In step 162, the action plan is displayed as determined by D2, H2, and IJ. And in step 164, the timeframe entered in step 126 is also displayed. As a final step in the methodology, the action plan may be optionally downloaded into a database, step 118. To one skilled in the relevant art, it is clear that the database of step 118 includes but is not limited to a personal information manager (PIM) such as ACT!™, Microsoft® Outlook®, a relational database management system, a personal digital assistant (PDA) such as a Palm™ handheld, or any other electronic database tool that is available or could in the future be made available for storing data.

Steps 160, 162, and 164 are likewise not intended to be limitations. A display device may take the form of a computer monitor, a portable computer display, a PDA display, a CRT, an LCD, a plotter, a printer, or any such display device that is available or could in the future be made available for displaying data.

Screen Shots

The present invention contemplates a wizard-based approach to development of the final action plan. Wizards are commonly used in modern graphical user interfaces (GUI). A wizard walks a user through a process in a series of steps until arriving at a result. Common among wizard-based interfaces is the presence of a pair of command buttons on each screen that take the user forward to the next step and backward to the previous step, obviously with the exception of the first and final screens which only move a user forward or backward, respectively. Forward and backward navigation is accomplished in the present invention through the presence of the Next and Back command buttons shown in the sample screenshots of FIGS. 6–12.

The sample screenshots of FIGS. 6–12 are designed using standard GUI application development controls, which include labels, textboxes, listboxes, command buttons, and comboboxes. The present invention expressly contemplates a GUI interface, although a less sophisticated command-line interface or menu-driven interface is within the scope of the present invention. Additionally, a world-wide-web-based implementation coded in HTML, DHTML, XML or their progeny is further contemplated by the inventor. Lastly, the present invention contemplates implementations that use embryonic or yet-to-be-conceived interface technology including voice recognition, touch screens, and virtual reality.

Final Action Plan

Figure 12:
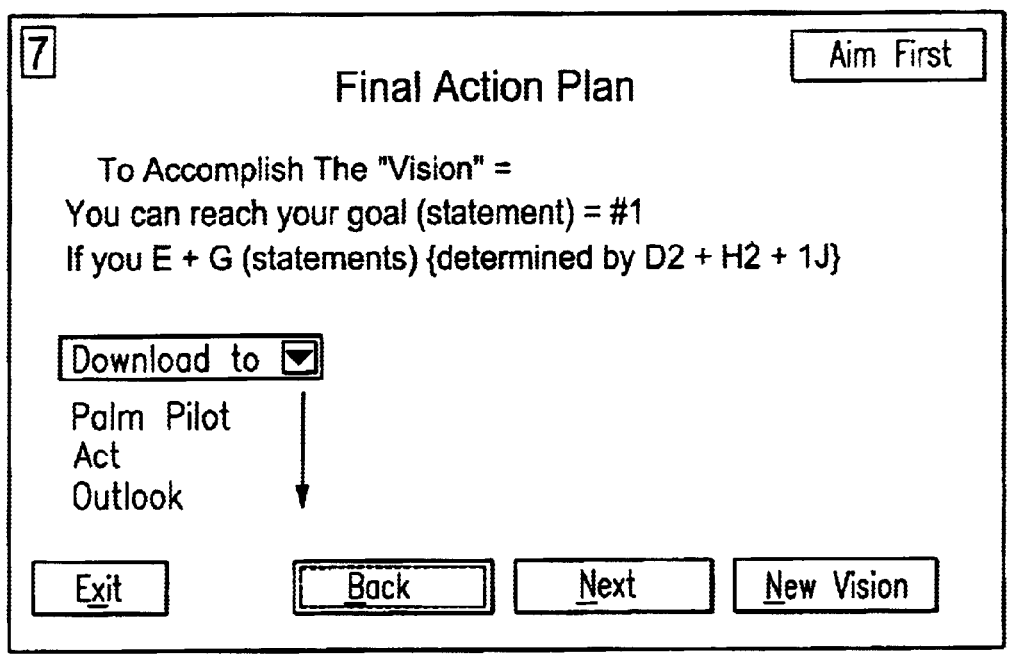
FIG. 12 is a software application window illustrating one embodiment of the final action plan as generated and displayed to a user.

FIG. 12 is an example screenshot displaying the final action plan. The final action plan addresses the steps the user must take to reach his or her goal as determined by formulas D2, H2, and IJ. The final action plan shows the user that he or she can reach the stated goal from step 102 by applying the statements obtained in (E) step 124 and (G) step 128. Further, each influencer (obstacle) specified in (B) step 106, is listed along with a creative solution for overcoming that obstacle. The timeframe entered in (F) step 126 reminds the user of the specific date by which the goal should be reached. Applying this to our example above, the final action plan displayed for the user might look like:

To Accomplish the Vision: Making $50,000 to invest and put children through school.

You can reach your goal: Sell top-end system and meet/exceed quota

If you: Offer to sponsor a charity bike ride

By: July 18th Board Meeting

And, if you: Make a proposal offering the best price

By: This week

A New Vision command button allows the user to restart the personal development training system all over again, beginning with step 102, for a different vision and goal.

One embodiment of the personal development training process includes a high-energy, motivational video segment showing the user achieving his or her vision. At or near the beginning of the system, the user is prompted to choose from a collection of images or photographs representing his or her conception of accomplishing the vision. Examples include images and photographs of fun and relaxing sporting activities such as golfing, surfing, skiing, hiking, and snowboarding. At or near the end of the personal development training process, the system compiles and displays a sequence of related scenes put together in a short motivational video presentation that graphically symbolizes the user's envisioned sense of accomplishment, reinforcing his or her chosen conception of the vision.

Figure 13:
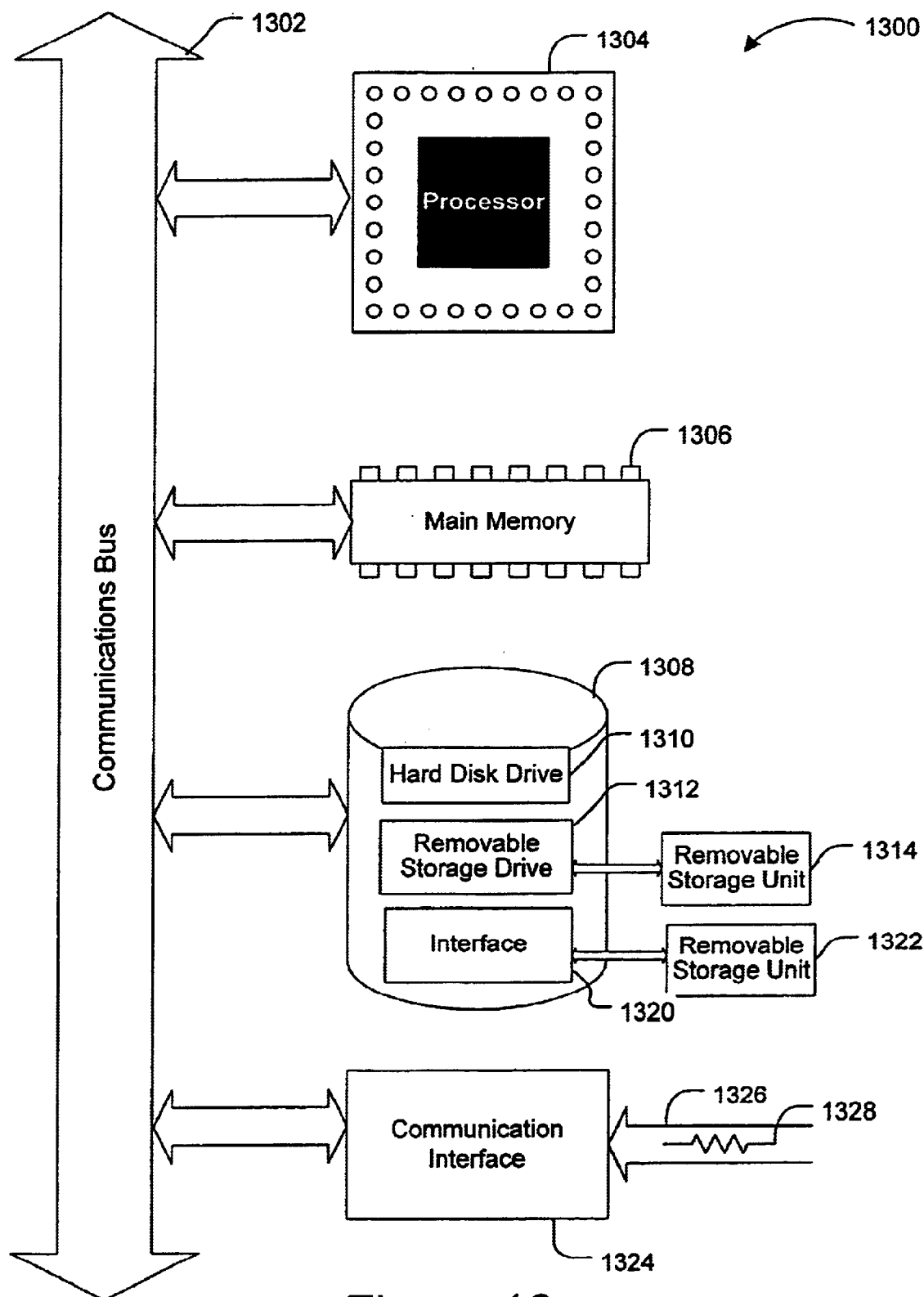
FIG. 13 is a diagram illustrating an example processor-based system according to one embodiment of the invention.

FIG. 13 is a block diagram illustrating an example computer system in which elements and functionality of the invention are implemented according to one embodiment of the present invention. The present invention may be implemented using hardware, software or a combination thereof and may be implemented in a computer system or other processing system. An exemplary computer system 1300 is shown in FIG. 13. Various software embodiments are described in terms of this exemplary computer system 1300. After reading this description, it will become apparent to a person having ordinary skill in the relevant art(s) how to implement the invention using other computer systems and/or computer architectures.

Referring now to FIG. 13, the computer system 1300 includes one or more processors, such as processor 1304. Additional processors may be provided, such as an auxiliary processor to manage input/output, an auxiliary processor to perform floating point mathematical operations, a digital signal processor (a special-purpose microprocessor having an architecture suitable for fast execution of signal processing algorithms), a backend processor (a slave processor subordinate to the main processing system), an additional microprocessor or controller for dual or multiple processor systems, or a coprocessor. It will be recognized that such auxiliary processors may be discrete processors or may be built in to the processor 1304.

The processor 1304 is connected to a communication bus 1302. The communication bus 1302 may include a data channel for facilitating information transfer between storage and other peripheral components of the computer system 1300. The communication bus 1302 further provides the set of signals required for communication with the processor 1304, including a data bus, address bus, and control bus (not shown). The communication bus 1302 may comprise any known bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and the like.

Computer system 1300 includes a main memory 1306 and may also include a secondary memory 1308. The main memory 1306 provides storage of instructions and data for programs executing on the processor 1304. The main memory 1306 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 1308 may include, for example, a hard disk drive 1310 and/or a removable storage drive 1312, representing a floppy disk drive, a magnetic tape drive, an optical disk drive, etc. The removable storage drive 1312 reads from and/or writes to a removable storage unit 1314 in a well-known manner. Removable storage unit 1314, represents a floppy disk, magnetic tape, optical disk, etc. which is read by and/or written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into the computer system 1300. Such means may include, for example, a removable storage unit 1322 and an interface 1320. Examples of such include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 1322 and interfaces 1320, which allow software and data to be transferred from the removable storage unit 1322 to the computer system 1300.

Computer system 1300 also includes a communications interface 1324. Communications interface 1324 allows software and data to be transferred between computer system 1300 and external devices, networks or information sources. Examples of communications interface 1324 include a modem, a network interface (such as an Ethernet card), a communications port, a PCMCIA slot and card, etc. Communications interface 1324 preferably implements industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Data Over Cable Service Interface Specification (DOCSIS), and so on.

Software and data transferred via communications interface 1324 are in the form of signals which can be electronic, electromagnetic, optical or other signals capable of being received by communications interface 1324. These signals 1328 are provided to communications interface 1324 via a channel 1326. This channel 1326 carries signals 1328 and can be implemented using wire or cable, fiber optics, a phone line, a cellular phone link, a radio frequency (RF) link, infrared interface (IR) or other communications channels.

Computer programming instructions (also known as computer programs or software) are stored in the main memory 1306 and/or the secondary memory 1308. Computer programs can also be received via communications interface 1324. Such computer programs, when executed, enable the computer system 1300 to perform the features of the present invention as discussed herein. In particular, the computer programs, when executed, enable the processor 1304 to perform the features and functions of the present invention. Accordingly, such computer programs represent controllers of the computer system 1300.

In this document, the term "computer program product" is used to refer to any media used to provide programming instructions to the computer system 1300. Examples of these media include removable storage unit 1314, removable storage unit 1322, a hard disk installed in hard disk drive 1310, and signals 1328. These computer program products are means for providing programming instructions to the computer system 1300.

In an embodiment where the invention is implemented using software, the software may be stored in a computer program product and loaded into computer system 1300 using hard drive 1310, removable storage drive 1312, interface 1320 or communications interface 1324. The software, when executed by the processor 1304, causes the processor 1304 and/or the computer system 1300 to perform the features and functions of the invention as described herein.

In another embodiment, the invention is implemented primarily in hardware using, for example, hardware components such as PALs or application specific integrated circuits (ASICs). Implementation of the hardware state machine so as to perform the functions described herein will be apparent to persons having ordinary skill in the relevant art(s).

In yet another embodiment, the invention is implemented using a combination of both hardware and software. It should be appreciated that modification or reconfiguration of the computer system 1300 of FIG. 13 by one having ordinary skill in the relevant art(s) will not depart from the scope or the spirit of the present invention. While particular embodiments of the present invention have been described above, it should be understood that they have been presented by way of example only, and not as limitations. The breadth and scope of the present invention is defined by the following claims and their equivalents, and is not limited by the particular embodiments described herein.

I claim:

1. A computer-implemented system for personal development training comprising:

user input comprising the user's goal, possible outcomes, influence factors on the possible outcomes, the weight of the influence factors on the possible outcome, creative solutions for positively affecting the influence factors, and the weight of affecting the influence factors;

a processor for processing the user input and generating an action plan using a methodology based on the weight of the influence factors and the weight of affecting the influence factors.

2. The system of claim 1 wherein the user input for each of the influence factors further comprises:

the effect of the influence factor on the possible outcome;
   a statement about what drives the influence factor;
   the timeframe under which the influence factor operates;
   the risk of affecting the influence factor; and
   the willingness to take the risk.

3. The system of claim 2 wherein the user input further comprises:

risk reduction actions for reducing the risk associated with affecting the influence factors; and
   the weight of acting to reduce said risk.

4. They system of claim 3 wherein the action plan comprises:

weighted and prioritized influence factors;
   weighted and prioritized creative solutions;
   risk-weighted and willingness-weighted creative solutions; and
   prioritized risk-reduction actions and weights.

5. The system of claim 1 wherein the system is implemented using at least one of a group consisting of software; a semiconductor device; a graphical user interface; a command-line interface; and a menu-driven interface.

6. The system of claim 1 wherein the action plan further comprises a video component for heightening the user's motivation and sense of accomplishment.

7. The system of claim 1 wherein the action plan is downloaded to a destination selected by the user.

8. The system of claim 7 wherein the destination is selected from a group consisting of a Palm Inc. Palm™ handheld, a personal digital assistant (PDA), an ACT!™ data store, an Outlook® data store, a personal information manager (PIM) data store, and a world-wide-web-based internet data store.

9. The system of claim 1 wherein the action plan is displayed on a display device selected from a group consisting of a computer monitor, a portable computer display, a personal digital assistant display, a CRT, an LCD, a plotter, and a printer.

10. A computer-implemented method for personal development training comprising the steps of:

obtaining user input comprising the user's goal, possible outcomes, influence factors on the possible outcomes and creative solutions for positively affecting the influencing factors;

for each influence factor, reducing a risk associated with the influence factor to an acceptable level if the risk is too high relative to the importance of the influence factor by iteratively querying the user for risk reduction actions;

generating and displaying an action plan to the user based on the user input.

11. The method of claim 10, and further comprising for each influence factor:

obtaining the effect of the influence factor on the possible outcome;
    obtaining the weight of the influence factor on the possible outcome;
    obtaining a statement about what drives the influence factor;
    obtaining the timeframe under which the influence factor operates;
    obtaining the weight of affecting the influence factor;
    obtaining the risk of affecting the influence factor; and
    obtaining the willingness to take said risk.

12. The method of claim 10 wherein the step of risk reduction comprises:

comparing the influence factor's risk to the influence factor's importance;
    displaying the creative solutions for positively affecting the influence factor;
    obtaining the risk reduction actions for reducing the risk associated with affecting the influence factor; and
    obtaining the weight of acting to reduce said risk.

13. A computer program product comprising a computer useable medium having computer instructions stored therein for generating an action plan based on user input, the computer program product comprising instructions for:

obtaining user input comprising the user's goal, possible outcomes, influence factors on the possible outcomes and rankings of the weight of the influence factors on the outcomes and the risk of affecting the influence factors generating and displaying an action plan to the user using a methodology based on the user rankings of weight and risk.

14. A computer-implemented method for guiding a user through a decision-making process on a particular issue comprising: obtaining a goal of the user in resolving the issue; obtaining possible outcomes related to the goal;

obtaining influence factors on the possible outcomes and rankings of the importance of the influence factors; iteratively eliciting creative solutions for positively affecting the influence factors, and obtaining rankings of importance and difficulty of positively affecting the influence factors, until a solution having an acceptably low difficulty-to-importance ratio is obtained; and generating a strategy unique to the user's particular issue using a methodology based on the rankings of the importance of the influence factors and the importance and difficulty of positively affecting the influence factors.

15. A computer system having software code that implements the method of claim 14.

16. A computer program product comprising a computer useable medium having computer instructions stored therein for generating a high end strategy based on user input, the computer program product comprising instructions for:

obtaining user input related to the user's goal, possible outcomes, influencing factors on the possible outcomes, and a quantitative ranking of the weight of each of the influencing factors; and;

generating and displaying an action plan to the user using a methodology based on the quantitative ranking of the weight of each of the influencing factors.

17. A computer-implemented method as claimed in claim 11, wherein the user is iteratively queried to reduce the risk if the weight of the influence factor on the outcome, the risk of affecting the influence factor and the willingness to affect the influence factor are each relatively high.

18. A computer-implemented method as claimed in claim 17, wherein the weight of the influence factor on the outcome, the risk of affecting the influence factor and the willingness to affect the influence factor are each ranked by the user on a scale of one to ten, and wherein the user is iteratively queried to reduce the risk if each of these rankings is greater than five.

19. A computer-implemented method as claimed in claim 12, wherein the action plan is generated by prioritizing the influence factors by the weight of the influence factors on the outcome, by prioritizing the solutions by the weight of affecting the influence factor, the risk of affecting the influence factor and the willingness to take the risk.

20. A computer program product as claimed in claim 13, wherein the methodology prioritizes the influence factors by their weight on the outcome.

21. A computer program product as claimed in claim 20, wherein the instructions further comprise:

obtaining solutions for affecting the influence factors, the weight of affecting the influence factors and the willingness to take the risk of affecting the influence factors, and wherein the methodology prioritizes the solutions by the weight of affecting the influence factors, the risk of affecting the influence factors and the willingness to take the risk.

22. A computer program product as claimed in claim 16, wherein the ranking of the weight of each of the influencing factors is on a scale of one to ten.

23. A software product for assisting a user in developing an action plan for achieving a desired outcome comprising:

means for obtaining one or more influence factors on the desired outcome and one or more creative solutions for positively affecting the influence factors;

means for obtaining quantitative rankings of the influence factors and the creative solutions; and means for generating the action plan by prioritizing the influence factors and creative solutions based on the quantitative rankings.

24. A software product as claimed in claim 23, wherein the quantitative rankings comprise:

rankings of the importance of the influence factors;

rankings of the importance of positively affecting the influence factors;

rankings of the difficulty of positively affecting the influence factors; and rankings of the willingness to positively affect the influence factors.

25. A software product as claimed in claim 24, and further comprising means for reducing the difficulty of affecting the influence factors by eliciting risk reduction actions when the quantitative rankings are relatively high.

* * * * *